(No Model.)
A. G. CASSIDY.
VALVE.
No. 592,625. Patented Oct. 26, 1897.
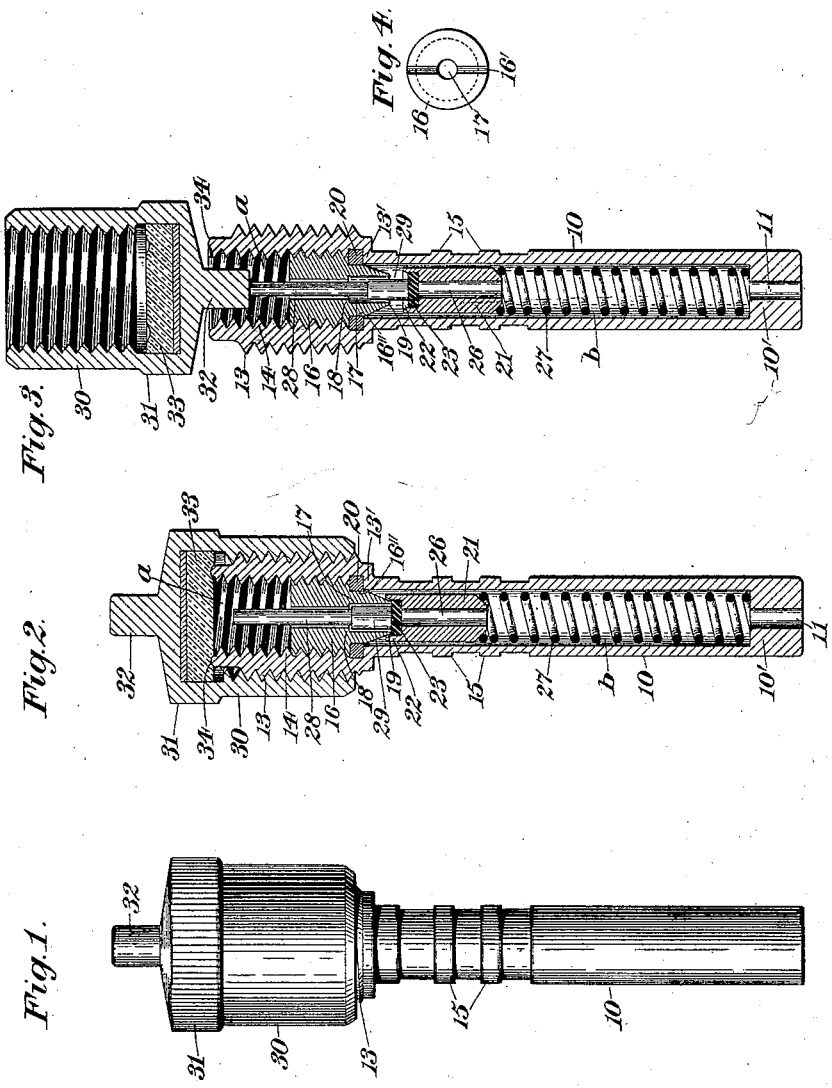
Witnesses:
J. L. Edwards Jr.
Fred. J. Dole.
Inventor:
Andrew G. Cassidy.
By his Attorney,
F. A. Richards.

UNITED STATES PATENT OFFICE.

ANDREW G. CASSIDY, OF HARTFORD, CONNECTICUT.

VALVE.

SPECIFICATION forming part of Letters Patent No. 592,625, dated October 26, 1897.

Application filed April 17, 1896. Serial No. 587,995. (No model.)

*To all whom it may concern:*

Be it known that I, ANDREW G. CASSIDY, a citizen of the United States, residing at Hartford, in the county of Hartford and State of Connecticut, have invented certain new and useful Improvements in Valves, of which the following is a specification.

This invention relates to valves, and more particularly to that class of valves adapted for use in connection with pneumatic tires; and the object of the invention is to provide a device of this character simple in construction, efficient in operation, and automatic in its action to positively prevent the escape of the fluid or air from the tire and also quickly and easily actuated to permit the inflation of said tire.

A further object of the invention is to provide a valve of this character whereby the parts or members thereof can be assembled and disassembled with facility to renew the packing or washers thereof when worn and without the necessity of removing the valve casing or body from the wheel-tire.

In the drawings accompanying and forming part of this specification, Figure 1 is an elevation of this improved valve assembled for use. Fig. 2 is a vertical sectional view thereof, showing the valve closed. Fig. 3 is a view similar to Fig. 2 and shows the valve open and also shows the removable cap in position to have its deflator actuate the plunger. Fig. 4 is an end view of the screw-threaded plug forming the valve-seat.

Similar characters of reference indicate like parts in all the figures of the drawings.

In devices of this character it is absolutely necessary that the valve be so constructed that the escape of air from the tire will be positively prevented, and it is also necessary in order to form a practicable device that the valve shall not only be simple in construction and not liable to get out of order, but also easily disassembled to permit the worn packing to be replaced, and hence, in view of the purpose of this class of valves, an apparently slight differentiation in construction of one device as compared with an analogous device may accomplish a material difference in the operation and practicability thereof. For instance, while it may be an apparently slight difference to have one device constructed with the end of a plunger or rod resting upon a packing or washer, while another device has the washer or packing encircling the plunger, yet in the latter device it will be obvious that the air will have a chance to escape intermediate the packing and such plunger, which could not be the case in the former device, so that while on cursory view it would apparently be only a slight differentiation in construction, yet it would be a sufficient difference, so far as these two elements are alone considered, to make one device practically perfect, while the other would be more or less defective, and hence in the construction of valve herein shown and described, which necessarily embodies, among other features, some apparently slight differences in construction, as compared with analogous devices; but these differences will, however, be found in practice to permit the construction of a practically perfect device adapted positively to prevent the exit of air.

In the preferred form thereof herein shown and described the device comprises a valve-body which is in the nature of a chambered casing 10, preferably tubular, having an opening or air-duct 11 extending longitudinally of its end wall 10'. This casing is preferably of differential diameter, thereby forming a larger and smaller chamber $a$ and $b$, respectively, opening into each other. The larger chamber is provided with exterior and interior screw-threads 13 and 14, respectively. This valve-body is provided on its exterior with suitable means, such as a series of annular ribs 15, whereby the casing or body can be more firmly secured in position against displacement in the extending rubber tube of a tire. Disposed within the chamber $a$ of this valve-casing is a removable exteriorly-threaded plug 16, having a longitudinal bore 17, preferably of differential diameters, whereby a shoulder 18 is formed for preventing the detachment or displacement of the plunger hereinafter set forth. The lower end of this plug is preferably cone-shaped to form a valve-seat 19, extending into the chamber $b$.

The valve-seat plug 16 is provided with a transverse slot 16' on its outer face whereby the plug can be removably but firmly secured in position with its screw-threads in engagement with the interior screw-threads 14 of the chamber $a$.

A suitable packing or washer 20 is disposed intermediate the juncture-wall 13', which is in the nature of an annular offset, of the chambers $a$ and $b$ of the casing and the screw-threaded portion of the plug 16, and which packing or washer is preferably of soft lead, whereby, when the valve-seat plug 16 is firmly screwed into position, it will form an air-tight engagement with such packing, and whereby, also, each time the plug is removed and replaced it will form a new bearing engagement with such packing, and thus constitute at all times an air-tight joint.

The plug has a turned face 16'' intermediate the screw-threads and its cone-shaped face whereby it will closely engage or substantially form a continuation of the inner wall of the smaller chamber, and thus prevent the packing 20 from becoming wedged or forced intermediate said plug and the inner walls of said chamber, which would thus prevent the formation of an air-tight joint.

Loosely fitting within the chamber $b$ is a suitable valve or valve member 21, adapted to permit air to flow around the sides thereof, and which valve is provided with a chambered or cup-shaped upper end 22, adapted to receive a suitable packing 23, preferably of soft rubber and preferably of disk form, whereby, when the valve is in its closed position, the packing will firmly engage the valve-seat 19 of the screw-threaded plug, and thus form an air-tight joint.

In the usual construction of valves it requires considerable loss of time and labor to remove the packings from their various positions after the same have in use become wedged therein, and in order, therefore, to obviate this objection with this improved valve the same is provided with a longitudinal bore or opening 26, adapted to permit the insertion of a tool or rod when the valve is detached from the casing, whereby the worn packing 23 can be quickly forced or pushed out of its chamber or seat.

A suitable spiral or coiled spring 27 is disposed intermediate the inner face of the end wall 10' of the chamber $b$ and one end of the valve, whereby said valve and its packing will be firmly and securely held in engagement with the valve-seat 19.

It will be observed that the walls of the cup-shaped portion of the valve flare or incline outward and when the valve is in its normal position embrace the lower end of the conical portion of the valve-seat 19, whereby the valve is not only guided to its seat, but is prevented from lateral motion when seated.

As a means for actuating this valve a suitable plunger in the nature of a rod 28 extends through and fits loosely in the bore 17 of the valve-seat plug 16 and is provided with an enlargement or enlarged end 29, fitting loosely in that portion of the bore having the largest diameter, and resting upon the valve 21. This plunger has its opposite end extending above or beyond the plug, whereby on the depression of said plunger the valve will be unseated or depressed against the action of its spring 27, and thereby permit the exit of air around the valve and through the bore 17 of the plug around the plunger or permit the tire to be inflated, as the case may be.

A suitable interiorly-threaded cap 30 is provided to close the valve-chamber $a$, and is adapted to engage the exterior threads 13 of the casing. This cap 30 is provided with a suitable milled annular ring or surface 31, whereby it can be easily manipulated, and it is also provided with a deflator in the nature of an extension or stem 32, whereby, when the cap is removed from the casing, said stem can be inserted into the chamber $a$ of the body to depress the plunger 28, and thereby actuate the valve to permit the exit of air from the tire.

In order to constitute an additional security against the escape of air, the interior end wall of this cap is provided with a suitable washer or packing 33, preferably of rubber, whereby, when the cap is firmly secured in position, such packing will firmly engage the edge 34 of the casing and tightly close the chamber $a$.

It has been found, however, in practice that when such packing is disposed with its face in engagement with the top of the cap it has a tendency to adhere thereto, whereby it turns with the cap, so that said packing becomes cut by the upper edge 34 of the casing and in a short time becomes practically useless. In order to obviate this serious defect and protect the packing, a plate, preferably of metal and preferably composed of brass, is inserted intermediate the inner end wall of the cap and the face of the rubber, whereby the washer or packing is prevented from adhering to the cap, and said cap is thereby left free to turn independently of said washer or packing.

In the use of this improved valve when the air-pump is placed in position with its nozzle or nipple in the chamber $a$ of the body the pressure of the air flowing through the bore of the valve-seat plug 16, to permit which the plunger is loosely fitted therein, as before stated, will depress the valve and permit the air to flow around the same and into the chamber $b$ and through the air-duct 11 into the tire. In some constructions of air-pumps, however, the nipple thereof can engage the upper end of the plunger and thereby depress the same and the valve to permit the air to flow around the valve, as above stated.

By means of this improved construction of valve not only is the same quickly and easily manipulated and effective in its operation, but the parts thereof can be quickly and easily separated to permit the removal of worn packings or washers and the insertion of new packings or washers without the necessity of removing the valve body or casing from the tire, as is necessary in many analogous constructions of this character—that is to say, by removing the cap 30 and unscrewing the valve-seat plug 16 the plunger 28 can be removed and the valve 21 detached and new packings inserted in place of the worn packings 20 and 23 and the parts of the device quickly and easily reassembled. Moreover, heretofore, as is a well-known fact to bicyclists, the removable cap of the valve has been depended upon to a large extent to prevent the escape of air, owing mainly to the fact that in the particular construction of valves the valve member thereof was not sufficient in itself to prevent such exit of air. In the present device, however, as the packing 23 is a solid member closing the bore of the plug, the cap 30 might be left off without danger of the air escaping.

Having thus described my invention, what I claim is—

1. The combination of a chambered casing exteriorly and interiorly threaded as described, of a bored, exteriorly-threaded plug having a valve-seat at its lower end; a headed plunger loosely mounted in said plug; a bored valve having a cup-shaped end extending over said plug; a packing in said end; and a spring sustaining said valve and adapted to press the same against the valve-seat on the plug.

2. The combination of a chambered valve-casing; a removable plug therein having a valve-seat and having a longitudinal bore; a loose plunger extending through said bore; a valve adapted to engage said seat and extending over said plug, and on which said plunger rests; and a spring intermediate said valve and the end wall of said casing.

3. The combination of a chambered valve-casing; a removable, bored plug therein having a valve-seat; a loosely-mounted bored valve having a chambered end extending over said seat and having a packing therein adapted to engage said seat; and a spring intermediate said valve and the end wall of said casing.

4. The combination of a chambered valve-casing; a removable plug therein having a valve-seat and having a longitudinal bore; a bored valve having a chambered or cup-shaped upper end having a disk-shaped packing therein adapted to engage the valve-seat, a plunger resting on said packing; and a spring intermediate said valve and the end wall of said casing.

5. The combination of a casing having an air-duct at one end, and having chambers of differential diameters, the inner wall of the larger chamber having screw-threads; a removable, exteriorly-threaded and longitudinally-bored plug engaging the interior threads of said chamber, and having a valve-seat extending into the smaller chamber; a packing intermediate the juncture-walls of said chambers and plug; a plunger extending through the bore of said plug; a valve in the smaller chamber having a chambered or cup-shaped end extending over said plug; a disk-shaped packing in said valve-chamber and adapted to engage the valve-seat, and upon which the plunger rests; and a spring intermediate said valve and one end of said casing.

6. The combination of a casing having an air-duct at one end, and having chambers of differential diameters, the wall of the larger chamber having exterior and interior screw-threads; a removable, exteriorly-threaded and longitudinally-bored plug engaging the interior threads of said chamber, and having a valve-seat extending into the smaller chamber; a packing intermediate the juncture-walls of said chambers and plug; a plunger extending through the bore of said plug; a valve in the smaller chamber having a chambered or cup-shaped end extending over said plug; a packing in said valve-chamber and adapted to engage the valve-seat, and upon which the plunger rests; a spring intermediate said valve and one end of said casing; and a removable exteriorly-threaded cap having an extension or stem on its outer face; a packing adjacent to its upper inner wall and a metal plate intermediate said packing and wall.

7. The combination of a chambered valve-casing; a removable plug therein having a conical lower end and provided with a longitudinal bore of differential diameters; a loose plunger having a head at one end fitted in said bore; a bored valve having a flared or cup-shaped end fitting over the conical end of said plug; packing mounted in said valve; and a spring intermediate said valve and the end of the casing.

ANDREW G. CASSIDY.

Witnesses:
FRED. J. DOLE,
HENRY BISSELL.